United States Patent [19]

Aeschbach et al.

[11] Patent Number: 5,492,709
[45] Date of Patent: Feb. 20, 1996

[54] PROCESS FOR PROTECTING A FAT AGAINST OXIDATION

[75] Inventors: Robert Aeschbach, Vevey; Hans-Juergen Wille, Villeneuve, both of Switzerland

[73] Assignee: Nestec S.A, Vevey, Switzerland

[21] Appl. No.: 339,946

[22] Filed: Nov. 15, 1994

[30] Foreign Application Priority Data

Dec. 17, 1993 [EP] European Pat. Off. .............. 93120358
Feb. 10, 1994 [EP] European Pat. Off. .............. 94102007

[51] Int. Cl.$^6$ ..................................................... A23D 9/06
[52] U.S. Cl. ............................................. 426/542; 426/541
[58] Field of Search ...................................... 426/542, 541

[56] References Cited

U.S. PATENT DOCUMENTS

| | | |
|---|---|---|
| 2,115,073 | 4/1938 | Ingraham . |
| 3,732,111 | 5/1973 | Berner et al. ............................ 426/542 |
| 4,900,565 | 2/1990 | Spies ......................................... 426/28 |
| 5,026,550 | 6/1991 | Aeschbach et al. . |
| 5,209,870 | 5/1993 | Todd .................................... 426/542 X |
| 5,227,183 | 7/1993 | Aung et al. ............................. 426/102 |

FOREIGN PATENT DOCUMENTS

| | | |
|---|---|---|
| 2061980 | 10/1992 | Canada . |
| 2184341A | 6/1987 | United Kingdom . |

OTHER PUBLICATIONS

Musher, British Complete Patent Specification No. 451,340 (1936).

*Primary Examiner*—Carolyn Paden
*Attorney, Agent, or Firm*—Vogt & O'Donnell

[57] ABSTRACT

Antioxidant principles are concentrated in a fat by mixing the fat with a vegetable material containing phenolic antioxidants at an elevated temperature to obtain a mixture. The mixture is pressed under a pressure of at least 40 bar to obtain a fat concentrated with antioxidant principles, which may be added to a fat-containing food to protect the food from oxidation.

16 Claims, No Drawings

PROCESS FOR PROTECTING A FAT AGAINST OXIDATION

BACKGROUND OF THE DISCLOSURE

This invention relates to a process for the protection of a fat against oxidation, in which the fat to be protected is directly contacted with a vegetable material containing phenolic antioxidants.

In the food industry, antioxidants are used to retard the oxidative degradation of fats by inhibiting the formation of free radicals. The food-quality antioxidants normally used may be of synthetic origin, for example butyl hydroxyanisole (BHA) and butyl hydroxytoluene (BHT) (although the use of these antioxidants is being increasingly opposed in food legislation), but are preferably of natural origin, mainly vegetable origin emanating from plant extracts. Rosemary is at present the most widely used starting material in this field.

Various methods have been used to extract the antioxidant principles of vegetable materials and to convert into powder form or into more or less viscous liquids. Among the methods which lead to an antioxidant in powder form, a two-stage extraction involving the successive use of hexane and ethanol is proposed, for example, in European Patent Application Publication No. 307 626.

As an example of a process leading to a liquid antioxidant, European Patent Application Publication No. 507 064 describes a process for solubilizing antioxidants of vegetable origin in a medium-chain triglyceride (MCT) with the aid of solvents. Medium-chain triglycerides are liquid over a very broad temperature range, are capable of withstanding oxidative degradation and have a high dissolving potential for antioxidants of vegetable origin.

The problem addressed by the present invention was directly to dissolve antioxidants of vegetable origin in a fat to be protected by simple mechanical extraction, avoiding the use of solvents which would have to be eliminated.

SUMMARY OF THE INVENTION

It has been found that simple pressing either with a screw press or with a hydraulic press under certain pressure conditions is sufficient to extract a large amount of antioxidants in a fat intended to be protected. This is surprising because known processes use polar solvents and more complicated means.

Accordingly, the process according to the invention is characterized in that the vegetable material rich in phenolic antioxidants and the fat are contacted at an elevated temperature, after which the mixture is pressed under a pressure of, or higher than, 40 bar. If necessary, the extract issuing from the press is then filtered or clarified to remove suspended solids.

The present invention also relates to the use of a fat treated as described above for protecting a food against oxidation.

DETAILED DESCRIPTION OF THE INVENTION

Any vegetable material containing phenolic antioxidants may be used as the starting material in the process according to the invention, including for example rosemary, sage, thyme, marjoram, savory, skins of cocoa nibs, tomato skins, either individually or in admixture. Among these starting materials, rosemary and sage represent materials of choice, rosemary being particularly preferred because it contains the antioxidants carnosic acid and carnosol which are odorless, colorless and substantially tasteless.

The starting material may be fresh, whole or more or less finely ground. It may be stripped with steam to eliminate most of the odoriferous principles, which are unwanted for certain applications where the antioxidant is required to be as neutral as possible. In other cases, it is desired to keep at least part of the odoriferous principles of the spices in the liquid antioxidant, in which case the starting material is not stripped. It is preferably present in dried form whether or not is ground or stripped.

The fat to be protected may be selected from fats of animal or vegetable origin which are sensitive to oxidation and which contain unsaturated fatty acids, including for example chicken fat, lard and palm oil which tend to be apolar.

The vegetable starting material and the fat, preferably melted beforehand, for example at 60° to 80° C., are mixed at an elevated temperature, preferably in the range from 90° to 120° C. This pretreatment may be carried out, for example, with intensive stirring in a mixer, in a scraped-surface heat exchanger or in an UHT steam injector using superheated steam. The pretreatment is preferably carried out for 60 to 90 minutes in a mixer to achieve suitable extraction of the antioxidants. In cases where a scraped surface heat exchanger or a steam injector is used, the pretreatment time is preferably from a few seconds to a few minutes.

It has been found to be of advantage to carry out the pretreatment in the presence of water by adding water to the mixture, preferably in a quantity of 10 to 20% by weight, based on the starting material, to increase the amount of antioxidant extracted.

In addition, in the case of rosemary for example, an enzymatic pretreatment of the starting material enables the extraction yield to be improved by 20 to 30%. To this end, the vegetable material, for example rosemary leaves, is incubated with 1% by weight of a glucanase in aqueous medium, for example for around 4 hours with stirring at a temperature of around 40° C., after which the suspension is filtered or centrifuged and the vegetable material thus treated is dried.

The ratio by weight of fat to vegetable material is selected to obtain an acceptable concentration of antioxidant in a high yield and is preferably 0.5 to 2.5:1.

The pretreatment is followed by extraction under high pressure of the suspension of vegetable material in the fat. A screw press or a piston press may be used for this purpose. Where a piston press is used, it is equipped with a filter at its exit.

In cases where a screw press is used, it is important to ensure that the starting mixture contains a minimum quantity of vegetable material to achieve a consistency of the dispersion capable of promoting a sufficient pressure drop to establish the pressure, thereby preventing the overly diluted fat from issuing without an extraction effect. After extraction, the crude oil extracted has to be treated to eliminate the residues of suspended vegetable material, for example by filtration or centrifugation.

In cases where a piston press is used, the pressure applied is progressively increased, for example in steps to a value of 40 bar or higher, and is kept at that level for one hour or several hours.

In this case, both pressing and filtration have to be carried out rapidly to avoid cooling during which the fat could solidify. To reduce this risk, the body of the press is advantageously heated.

In order further to increase the quantity of antioxidant incorporated and better to utilize the vegetable starting material, the extraction may be recommenced by recycling a first extract of antioxidant in the preheated fat by contacting it with another batch of vegetable material. A fat containing up to 7% by weight of antioxidant can be obtained in this way.

Depending on the type of vegetable material used, for example a spice, and the type of application envisaged, it may be necessary to decolor and deodorize the fat containing the antioxidant. The fat may be decolored by mixing with active carbon or bleaching clay, heating and filtering. The substances responsible for the color are thus retained on the adsorbent.

For deodorization, the fat is preferably distilled in vacuo, for example in countercurrent in a falling film or thin layer with superheated steam.

A fat treated as described above may be used to protect a food from oxidation. For example, it may be used in the concentrated form in which it accumulates after extraction and mixed with the fat to be stabilized, so that the concentrate is diluted and the antioxidant content adapted to the product to be protected.

The protected fat may also be used, for example in the form of the concentrate mentioned above, to protect the fatty phase of a food, for example a meat, a stock, a sauce, a soup or a cream. In this case, the concentrate is mixed with the remainder of the fat to obtain the desired fat content dictated by the recipe.

EXAMPLES

The invention is illustrated by the following Examples in which parts and percentages are by weight, unless otherwise stated.

Example 1

3 kg of chopped rosemary leaves are mixed with 1.5 kg of chicken fat preheated to 60° C. in the presence of 300 g of demineralized water. After treatment for 1 hour at 100° C. in a LÖDIGE mixer, the mixture is pressed in a KOMET press with an RSL screw of which the head is heated to 140° C. and of which the outlet orifice has a diameter of 6 mm. 2.9 kg of a cake are separated and 1.1 kg of crude liquid fat is collected. This crude fat is heated to 60°–80° C. and then clarified in a PADBERG centrifuge operating at 14,000 r.p.m. 0.8 kg of stabilized chicken fat is thus obtained. The yield of clarified fat is 53.3% (based on the chicken fat used).

Example 2

The procedure is the same as in Example 1, except that 500 g of lard preheated to 80° C. are mixed with 1 kg of chopped sage leaves in the presence of 200 g of demineralized water. A crude molten fat containing 1.59% of antioxidant (analyzed as the sum of carnosol and carnosic acid by high-performance liquid chromatography, HPLC) is obtained. The yield based on the fat used is 57.8%.

Example 3

The procedure is as in Example 2, except that the fat to be protected is chicken fat. A crude molten fat containing 1.52% of antioxidant is obtained in a yield of 87.4%, based on the chicken fat used.

Example 4

1 kg of chopped rosemary leaves stripped with steam are moistened with 200 g of water, then the whole is mixed for 20 minutes in a LÖDIGE mixer in which the double wall is heated with steam to 120° C. 500 g of chicken fat preheated to 60° C. are then added and the whole is stirred for 60 minutes at 100° C. in the mixer. Immediately after the pretreatment, pressing is carried out for 60 minutes with still molten fat under a pressure of 500 bar in a CARVER piston press equipped with a filter cage and a crude fat containing 1.11% of antioxidant is collected in a yield of 33.7%, based on the fat used.

Example 5

The procedure is as described in Example 4, except that 1 kg of chicken fat is used. A crude fat containing 0.77% of antioxidant is obtained in a yield of 69%, based on the fat used.

Example 6

The procedure is as described in Example 4, except that 2 kg of chicken fat is used. A crude fat containing 0 5% of antioxidant is obtained in a yield of 80.9%, based on the fat used.

Example 7

The procedure is as described in Example 4, using the same ratios of vegetable material to fat, except that the fat used is palm oil. A crude fat containing 1.21% of antioxidant is obtained in a yield of 34% based on the fat used.

Example 8

1 kg of non-stripped dry sage leaves is stirred with 200 ml of demineralized water in a mixer in which the double wall is heated to 120° C., and then with 500 g of chicken fat—preheated to 60° C.—for 1 h at 100° C., followed by hot pressing in a CARVER piston press equipped with a filter cage. A crude fat containing 1.31% of antioxidant is thus obtained in a yield of 38.3%, based on the fat used.

Example 9

The procedure is as described in Example 8, except that the fat treated is lard. A crude fat containing 1.31% of antioxidant is obtained in a yield of 38.3%, based on the fat used.

Example 10

To protect a batch of fat intended for use in a food, a portion of stabilized fat in the form of a concentrate is added to the batch of fat in a proportion of 1 part of concentrate to 500 parts or 100 parts of untreated fat. The treated fat used is preferably of the same type as the untreated fat.

The protection factor is measured by using the accelerated RANCIMAT oxidation test described in Example 13 of European Patent Application Publication No. 326 829, but at a temperature of 110° C. The induction time of the fat protected by the portion of fat stabilized by the process according to the invention is determined by adding 0.2% or 1% of stabilized fat to the fat to be protected and is placed in a ratio to the reference induction time of the unstabilized fat, which gives the antioxidant index. The results are set out in Table I below:

Table I

| Example, fat, quantity (%) | | Antioxidant index |
| --- | --- | --- |
| 2, Lard | 0.2 | 4 |
| 3, Chicken fat | 0.2 | 3.4 |
| 4, Chicken fat | 0.2 | 6.1 |
| 5, Chicken fat | 0.2 | 3.9 |
| 6, Chicken fat | 0.2 | 3 |
| 7, Palm oil | 1 | 1.7 |
| 8, Chicken fat | 0.2 | 3.5 |
| 9, Lard | 0.2 | 3.7 |

We claim:

1. A process for concentrating antioxidant principles in a fat comprising mixing a fat, water and a vegetable material containing phenolic antioxidants at an elevated temperature to obtain a mixture, wherein the water is present in the mixture in an amount of 10% to.20% by weight based upon the weight of the vegetable material, and pressing the mixture under a pressure of at least 40 bar to obtain a fat concentrated with antioxidant principles.

2. A process according to claim 1 wherein the fat and vegetable material are present in the mixture in a ratio of 0.5 to 2.5:1.

3. A process according to claim 1 further comprising mixing the fat concentrated with antioxidant principles with a second portion of a vegetable material containing phenolic antioxidants to obtain a second mixture and pressing the second mixture under a pressure of at least 40 bar to obtain a fat further concentrated with antioxidant principles.

4. A process according to claim 1 wherein the fat and vegetable material are mixed at a temperature of from 90° C. to 120° C.

5. A process according to claim 1 wherein the mixture is pressed in a piston press equipped with a filter cage at a temperature such that the fat does not solidify.

6. A process according to claim 1 wherein the mixture is pressed in a screw press and further comprising, after pressing, removing residues of vegetable material from the pressed fat.

7. A process according to claim 6 wherein the pressed fat is filtered.

8. A process according to claim 6 wherein the pressed fat is centrifuged.

9. A process according to claim 1 wherein the vegetable material is rosemary.

10. A process according to claim 1 wherein the vegetable material is sage.

11. A process according to claim 1 wherein the fat is of animal origin.

12. A process according to claim 11 wherein the fat is chicken fat.

13. A process according to claim 11 wherein the fat is lard.

14. A process according to claim 1 wherein the fat is of vegetable origin.

15. A process according to claim 14 wherein the fat is palm oil.

16. A process for protecting a fat-containing food against oxidation comprising adding a fat concentrated with antioxidant principles obtained from the process of claim 11 to a fat-containing food.

* * * * *

UNITED STATES PATENT AND TRADEMARK OFFICE
CERTIFICATE OF CORRECTION

PATENT NO. : 5,492,709
DATED : February 20, 1996
INVENTOR(S) : Robert AESCHBACH, et al.

It is certified that error appears in the above-indentified patent and that said Letters Patent is hereby corrected as shown below:

Column 5, line 19 (line 5 of claim 1), delete "to.20%" and insert therefor --to 20%--.

Column 6, line 31 (line 3 of claim 16), "11" should be --1--.

Signed and Sealed this

Eleventh Day of June, 1996

*Attest:*

BRUCE LEHMAN

*Attesting Officer*     *Commissioner of Patents and Trademarks*